United States Patent [19]

Lu et al.

[11] Patent Number: 4,865,421
[45] Date of Patent: Sep. 12, 1989

[54] GLARE-PROOF SHIELD FOR OUTSIDE REAR VIEW CAR MIRRORS

[76] Inventors: Chih-Hsiung Lu, 4th Fl, No. 5, Lane 306, Kung Kuan Road., Peitou, Taipei, Taiwan; Jill Hui-Ju Lu, 907 Manley Drive, San Gabriel, Calif. 91776

[21] Appl. No.: 167,382

[22] Filed: Mar. 14, 1988

[51] Int. Cl.$^4$ ............................................. G02B 27/00
[52] U.S. Cl. .................................. 350/276 R; 350/283
[58] Field of Search ................... 350/276 R, 277, 278, 350/279, 283

[56] References Cited

U.S. PATENT DOCUMENTS 4,560,251 12/1985 Mürjahn .............................. 350/283

Primary Examiner—Bruce Y. Arnold
Assistant Examiner—Loha Ben

[57] ABSTRACT

This glare-proof shield for the outside rear view mirrors of cars is made by using 6 mm thick piece of frameless metal coated reflective glass such as a glass available in the market having a trade name of SOLARFLEX, which has the property of 8% transmittance to visible light. It is designed to have a five-edged shape like this ⌂ and about 10 inches×10 inches in size (see FIG. 1). Similar to the side windows it is installed within each of the front door frames on the interior side of the window glass near the lower front corner through which the outside rear view mirror is viewed. When in use at night, it is raised into position high enough to shield the outside rear view mirror completely (see FIG. 1). Because the anti-glare glass has the property of 8% transmittance to visible light, about 92% of the reflection which originates from the outside rear view mirror is absorbed and part of the other 8% is also deflected by refraction through the shield before the reflection reaches the eyes, thus safely eliminating nearly all of the glare problems from the rear without reducing the ability to see outside things clearly.

4 Claims, 1 Drawing Sheet

GLARE-PROOF SHIELD FOR OUTSIDE REAR VIEW CAR MIRRORS

BACKGROUND OF THE INVENTION

When driving a car, judging the traffic conditions to the rear is completely dependent on the rear view mirrors. At night the outside rear view mirrors currently in use often reflect bright objects directly into the eyes, especially when cars behind are using their high beams. This can make the drivers very uncomfortable, tense or nervous and affects their judgement of distance jeopardizing safety. A glare-proof shield to solve these glare problems is necessary, but is not commercially available at present.

Sometimes to reduce the glare, darkening shields are placed on the side and back windows or tinted glass used bilaterally and posteriorly for the windows. Although this does cut down some of the glare at night, it also reduces the ability to see things outside clearly (especially when the car is backing up). This affects driving safety since the shields are permanent, and that is the reason I have designed an adjustable non-permanent glare-proof shield for the outside rear view mirrors.

SUMMARY OF THE INVENTION

This glare-proof shield for the outside rear view mirrors of cars consists of a 6 mm thick piece of frameless anti-glare glass (using metal coated reflective glass such as a glass available in the market having a trade name of SOLARFLEX, which has the property of 8% transmittance to visible light) about 10 inches×10 inches in size shaped with five edges like this (see FIG. 1). Similar in installation, appearance, and operation to the side windows, it is installed within each of the front door frames on the interior side of the window glass, in such a way that it can be raised when necessary to shield the corner of the side window through which the outside rear view mirror is viewed (see FIG. 1). It can be raised and lowered manually with a crank handle the same way that the side windows usually are, but it would be more convenient to use an electric switch controlled by the driver.

DESCRIPTION OF THE PREFERRED EMBODIMENT

Figure 1:
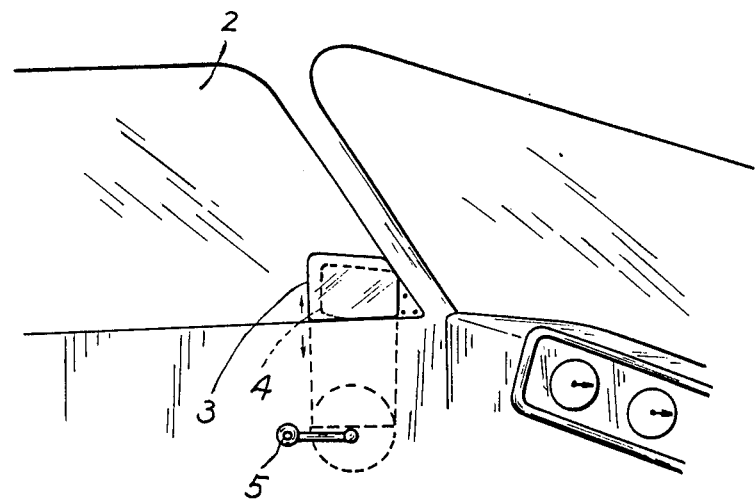
FIG. 1: A view of the glare-proof shield on the inside of the left front side window as seen from the driver's seat showing its five edged shape and its position when raised to completely shield the outside rear view mirror.

This glare-proof shield 3 for the outside rear view mirrors 4 of cars uses a 6 mm thick piece of frameless anti-glare glass with the property of 8% transmittance to visible light. Its five-edged shape (like this ) is designed to match the interior lower corner of each of the front side windows 2 and is about 10 inches×10 inches in size in order to keep it as small as possible while still rising high enough to completely shield the view of the outside rear view mirrors for tall drivers (see FIG. 1). Similar in appearance and operation to the side windows, the anti-glare glass is attached to a mechanism installed within a door frame of at least one of the car front doors on interior side of a window glass. The mechanism is connected to a crank handle 5 or an electric switch which is turned or actuated to raise or lower the anti-glare glass. Such a mechanism for raising or lowering the anti-glare glass is similar and juxtapositional to a conventional mechanism for raising or lowering the side window glass of the car. When not in use, the anti-glare glasses are out of sight within the door frames. For use at night they only need to be raised high enough to shield the outside rear view mirrors completely (see FIG. 1). The shield has, in accordance with practical experiments, a property of about 8% transmittance to visible light, of which 92% of the reflection which originates from the outside rear view mirror is absorbed and the remaining 8% is also deflected by refraction through the shield before the reflection reaches the eyes, thus producing an anti-glare effect good enough to solve nearly all of the glare problems from the rear without affecting safety, since the view in all other directions is unimpeded. Finally, this glare-proof shield is totally independent from the side window and works equally as well when the window is up as when the window is down.

In order to avoid abrasion or scratching of the special coating on the anti-glare glass after long use and to prevent its breaking into flying pieces on impact, I suggest that the anti-glare glass be manufactured the same way as laminated glass, which consists of two glass panes and a sandwiched plastic innerlayer.

A most suitable material for the anti-glare glass is the metal coated reflective glass such as a glass available in the market having a tradename of SOLARFLEX, which is produced by Taiwan Glass Industrial Corporation located in Taipei, Taiwan, R.O.C. It is manufactured with sputtering process in vacuum chambers by coating the metals on one surface of the glass to form a homogeneous metal film. For safety purposes as I have said, I would cover the metal-coated surface with another layer of glass.

We claim:

1. A glare-proof shield for outside rear view car mirrors comprising:
   an anti-glare glass having a size of about 10 inches×10 inches, depending upon a size of an outside rear view mirror and types of a car, said anti-glare glass having a thickness of about 6 millimeters, and being secured to a mechanism installed within a door frame of at least one of the car front doors on interior side of a window glass; said mechanism being connected to a crank handle or an electric switch provided for said mechanism for operatively raising or lowering said anti-glare glass, said mechanism being similar and juxtapositional to a conventional mechanism for raising or lowering said side window glass, said anti-glare glass being installed near a lower front corner of the window through which an outside rear view mirror is viewed.

2. A glare-proof shield according to claim 1, wherein said anti-glare glass is a metal coated reflective glass which is made by coating metals on a glass surface to form a homogeneous metal film on the glass surface.

3. A glare-proof shield according to claim 1, wherein said anti-glare glass is a laminated glass.

4. A glare-proof shield according to claim 1, wherein said anti-glare glass has an 8% transmittance to visible light therethrough.

* * * * *